3,791,944
PROCESS FOR THE POLYMERIZATION OF UNSATURATED COMPOUNDS
Raffaele Ercoli, Mauro Guainazzi, and Giuseppe Silvestri, Palermo, Italy, assignors to Snam Progetti S.p.A.
No Drawing. Filed May 12, 1972, Ser. No. 252,879
Claims priority, application Italy, May 13, 1971, 24,467/71
Int. Cl. C08f 1/28, 3/04
U.S. Cl. 204—59 R                    10 Claims

ABSTRACT OF THE DISCLOSURE

Alpha olefins are polymerized in an activated, anhydrous halogenated hydrocarbon. The anhydrous halogenated hydrocarbon is activated by passing through it an electric current using an aluminum or aluminum alloy anode. The alpha olefin is then passed into the activated halogenated hydrocarbon and polymerized.

---

The present invention refers to a novel process for the polymerization of unsaturated compounds.

Some processes are known from the art for the preparation of polymers starting from unsaturated compounds in presence of catalysts.

According to such processes, for instance, it is possible to obtain dimers, trimers and oligomers starting from alpha-olefins, while, for obtaining high polymers, use is made of very high pressures in presence of radicalic promoters; of recent date use has been made of low pressures in the so-called low pressure processes, but by working in presence of peculiar catalysts consisting of the product obtained from the reaction between metallorganic compounds and transition metal compounds, or in presence of catalyst consisting of transition metal oxides supported on particular carriers and eventually reduced in situ.

It has now been found a process for obtaining polymers starting from unsaturated compounds by means of electric current which is passed through an electrolytic conductor, which is substantially free from water.

More particularly the invention process is carried out in two stages: the former consists of the formation of polymerization initiators by electrolysis, while the latter consists in contacting the unsaturated compound with the mixture containing the initiator obtained from the first stage: the second stage is beginning after the stop of the current delivery.

According to a preferred way of carrying out the above process, the invention is performed by (i) passing a current through a cathode and an anode, this latter consisting of a metal selected between aluminium or alloys containing same, in a medium which is substantially free from water, the medium being advantageously constituted by a substituted hydrocarbon and an auxiliary electrolyte, (ii) stopping the current delivery and then (iii) feeding the unsaturated compound to the reaction zone, eventually diluted by inert solvents. The polymerization also occurs, when the current is delivered in presence of the unsaturated compound; when the initiator is formed, the delivery is stopped and the polymerization runs out by itself.

It is obviously possible also to make the electrolysis zone useful for the initiator formation to be separated from the polymerization zone, by working into two different reaction vessels, in the second of which are introduced the unsaturated compound and the mixture containing the initiator produced by the electrolysis carried out in the first reaction vessel.

As substituted hydrocarbon we mean a hydrocarbon in which one hydrogen atom is replaced by halogen atoms; a peculiar use is made of dichloroethane.

The auxiliary electrolyte is any compound, partially soluble into the aforesaid substituted hydrocarbon; therefore it has to undergo a partial dissociation so that to give rise to ions and to increase the medium conductibility. The quaternary ammonium salts may be mentioned from an illustrative point of view.

As unsaturated compound we mean all the compounds containing at least one $CH_2=C$ group or having the formula $R—CH=CH_2$; alpha-olefins are mentioned and particularly ethylene, propylene, 2-methylbutene, which can be utilized as such or mixed with one another.

The voltage between the electrodes depends also on the cell geometry and generally ranges from 2 to 300 volts. The current density ranges between 0.01 and 30 amperes/m.$^2$.

The choice of temperature and pressure is not critical: it is possible to work at pressures ranging from the atmospheric one and 100 atmospheres, and at temperatures ranging from $-20°$ to $100°$ C.

As above said the reaction medium necessary to the formation of the polymerization initiator is a halogenated hydrocarbon containing at least a chlorine, bromine or iodine atom, which is bound to non-aromatic atoms.

A peculiar mention can be made of 1,2-dichloroethane, but it is possible to employ also methyl chloride, methylene chloride, chloroform, carbon tetrachloride, 1,1,2,-trichloroethane, propyl bromide, butyl iodide and the like.

Also the quaternary ammonium salts, as for instance tetramethylammonium chloride, which are employed as auxiliary electrolytes, may be replaced by other electrolytes, which are reduced with difficulty, provided that their solubility characteristics allow the current passage through the medium.

The unsaturated compound can be diluted by adding aliphatic or cycloaliphatic hydrocarbons.

The cathode material can be selected from a wide class of electrical conductor, and preferably is selected among aluminium, alloys thereof, transition metals, alloys thereof and graphite.

An advantageous characteristic of the inventive process consists of the employment of an anode constituted by commercial technical aluminium, having a purity not higher than 99.5% which can be used without purifications except but a starting pickling of the surface.

Further working particularities will be pointed out by the following examples hereinafter reported in order to only better illustrate the invention.

EXAMPLE 1

This test was performed in a pressure-proof electrolytic cell, able to rotate on an axis inclined at 45°. The anode consisted of a hollow cylinder constituted by technical aluminium and having 120 cm.$^3$ capacity. 36 g. of 1,2-dichloroethane and 0.5 g. of tetrabutylammonium chloride were introduced into it under a nitrogen atmosphere. The cathode was a coaxial little cylinder consisting of stainless steel or technical aluminium, which was plunged into the solution. After having been closed the cell it was rotated, and ethylene was introduced under pressure. The cell was connected to a generator and the reaction was carried out according to the conditions reported in the following Table 1. Therein are reported also the obtained results.

TABLE 3

| | Temp., °C. | Initiation | | Polymerization | | Ethylene pressure (atm.) | | Product, g. | | Anode consumption (g.) |
|---|---|---|---|---|---|---|---|---|---|---|
| | | Anode c.d. (ma./sq. cm.) | C Coul. | Anode c.d. (ma./sq. cm.) | C Coul. | Start | Fin. | Polyt. | Oils | |
| 1 | 0 | 0.16 | 500 | 0.03 | 660 | 31 | 15 | 8.6 | 5.2 | 0.22 |
| 2 | −9 | 0.04 | 320 | 0.03 | 950 | 21 | 17 | 3.0 | 3.6 | 0.584 |
| 3 | 0 | 0.16 | 800 | (1) | | 32 | 19 | 13.0 | 2.4 | 0.125 |
| 4 | 11 | 0.08 | 903 | (2) | | 35 | [2]15 | 12.1 | 1.0 | 0.231 |

[1] = the autoclave was rotating for 100 hours without any electrical delivery.
[2] = the electrical delivery was stopped; the rotating autoclave was cooled at 0° C. for 24 hours and kept rotating at 11° C. for 160 hours.

NOTE.—c.d.=current density referred to the apparent surface.

EXAMPLE 2

The test was firstly carried out at the atmospheric pressure by employing a glass electrolytic cell, having a cylindrical symmetry and provided with a magnetic stirrer. The electrodes and the introduced solution were equal to the ones of Example 1.

The electrolysis was carried out under a nitrogen atmosphere, at 0° C., and by passing 600 coulombs at an anode current density equal to 0.3 ma./cm.$^2$.

The suspension obtained by the electrolysis was under nitrogen transferred into an autoclave having vitrified inner walls; therein ethylene was introduced up to a pressure of 40 atmospheres (starting, without stirring).

The autoclave had been rotating at an axis inclined at 45° C., in a bath thermostated at 0° C. After 24 hours the residual ethylene was removed. It was obtained: 1.35 g. of polyethylene and 0.040 g. of oils (97% selectivity).

At the end of the electrolysis stage the weight consumption of anode was 0.090 g.

What we claim is:

1. A process for the polymerization of an alpha-olefin which comprises:
    (a) first forming a polymerization initiator by passing an electric current through a substantially anhydrous mixture of a halogenated hydrocarbon and a quaternary ammonium compound by means of an anode which comprises aluminum or an aluminum alloy and a cathode which comprises of aluminum, an aluminum alloy, transition metals, a transition metal alloy or graphite, until said polymerization initiator is formed;
    (b) therafter, passing the olefin into said polymerization initiator to polymerize said olefin.

2. A process according to claim 1 characterized in that the halogenated hydrocarbon is selected from the group consisting of 1,2-dichloroethane, methylchloride, methylene chloride, chloroform, carbon tetrachloride, 1,1,2-trichloroethylene, propyl bromide and butyl iodide.

3. A process according to claim 1 characterized in that the halogenated hydrocarbon is 1,2 dichloroethane.

4. A process according to claim 1 characterized in that the quaternary ammonium compound capable of dissociation to give electrolytes is selected from the group consisting of tetralkylammonium chloride, bromide and iodide.

5. A process according to claim 4 characterized in that the quaternary ammonium compound is tetrabutylammonium chloride.

6. A process according to claim 1 characterized in that anode comprises technical aluminium having a purity lower than 99.5%.

7. A process according to claim 1 characterized in that the polymerization initiator is formed by applying a voltage between the electrodes ranging from 2 to 300 volts, and at a current density ranging from 0.01 to 300 amperes/m.$^2$.

8. A process according to claim 1 characterized in that the reaction is carried out at temperatures ranging from −20° to 100° C., and at pressures ranging from the atmospheric one to 100 atmospheres.

9. A process according to claim 1 characterized in that the unsaturated compound is ethylene.

10. A process for the polymerization of ethylene which comprises:
    (a) first forming a polymerization initiator by passing an electric current through a substantially anhydrous mixture of a halogenated hydrocarbon and a quaternary ammonium compound, said electric current being applied at a voltage of from 2–300 volts and at a current density of from 0.01–30 amperes/m.$^2$ by means of an anode which comprises aluminum or an aluminum alloy and a cathode which comprises aluminum or an aluminum alloy to form said polymerization initiator
    (b) thereafter, passing ethylene into said polymerization initiator to polymerize the ethylene.

References Cited
UNITED STATES PATENTS

| 3,140,276 | 7/1964 | Forster | 204—59 |
| 3,437,570 | 4/1969 | Wisdom | 204—59 |
| 3,464,960 | 9/1969 | Sobieski et al. | 204—59 |

FREDERICK C. EDMUNDSON, Primary Examiner